Jan. 24, 1950  E. R. MORTON  2,495,382
MOTOR CONTROL CIRCUIT
Filed Aug. 6, 1946

INVENTOR
E. R. MORTON
BY
P. C. Smith
ATTORNEY

Patented Jan. 24, 1950

2,495,382

UNITED STATES PATENT OFFICE 2,495,382

MOTOR CONTROL CIRCUIT

Edmund R. Morton, Brooklyn, N. Y., assignor to Bell Telephone Laboratories, Incorporated, New York, N. Y., a corporation of New York Application August 6, 1946, Serial No. 688,734

11 Claims. (Cl. 318—257)

This invention relates to motor control circuits and specifically to means operated by such circuits for controlling the speed of such motors.

The invention is concerned with that field of motor control circuits wherein the speed and direction of rotation of a motor are controlled by an electrical circuit which is responsive to control signals of variable polarity and magnitude supplied to the input thereof. Under the influence of such control signals said circuit controls the supply of driving power to the motor. This power is required to be a function of the difference between the control signal and the corresponding speed of the motor in order that the applied power will be adequate to drive the motor at the required speed under load without producing an excessive speed when the load is removed. That is, the speed of the motor must have a subtractive effect on the power application dictated by the control signal in order to prevent or inhibit undesired excessive speeds favorable under certain conditions of loading. The employment of the invention disclosed herein permits the application of power to said motor as a function of the difference between the control signal and an electrical parameter representing the speed of the motor, said parameter being realized by a novel means and compared thereby to said control signal.

The terminal voltage of the motor, when driven, will be a function, not only of speed, but of load due to the armature current necessary to drive the motor. This current produces a voltage across the armature resistance in addition to the applied terminal voltage, thereby having an internal effect on the speed of said motor.

One well-known method of deriving a voltage proportional to the speed of a motor is to couple to the motor a generator which supplies to the control circuit a voltage with practically no load on the generator which voltage will be a function of the speed of the motor driving said generator.

This invention has for its object the simplification of a means of deriving a voltage proportional to the speed of a motor. This voltage is unmodified by the load on said motor and obviates the need of an auxiliary generator.

In the disclosed exemplary embodiment of the invention a control signal is applied to a control circuit, for example, by the manual operation of a potentiometer. This causes vibrating relays to apply power pulses to the motor armature, which pulses are of constant frequency but of varying duration in accordance with the power requirements of the motor. Periodicity of pulses of power is desirable for smooth and reliable operation but applicant's invention is not limited to such a constant frequency in order to perform its intended function.

During the intervals between the applications of power pulses the motor armature is connected to a condenser. The condenser acquires a charge equal to the counter-electromotive force of the motor since at this time no current is flowing through the armature other than that necessary to charge said condenser. The value of the condenser is selected such that the time constant of the charging circuit and the power so abstracted from the armature are negligible.

The condenser is permanently connected back to the control circuit in such a manner that its voltage is compared with the control signal by the control circuit as will be explained hereinafter. The resistance of the coupling into the control circuit is sufficiently high in comparison with the size of the condenser such that loss of charge of the condenser during the time it is disconnected from the armature is negligible.

The effect of the use of this invention is that the net control voltage applied to the control circuit is the algebraic sum of the control signal and the condenser voltage. The latter voltage is at all times proportional to the speed of said motor and incidentally proportional to any deviation of the motor speed from the desired speed and consequently manifests itself, in the foregoing described manner, in correction of the speed of said motor toward the said desired speed. The desired speed may be zero from a condition of rotation in which case the invention will effect a quick stopping of said motor when the control signal is reduced to zero indicating a desire to stop said motor.

The foregoing general description of this invention, as well as more detailed features, will be apparent from the following disclosure of its association and cooperation with such a control circuit as previously outlined. Following is a general description of the drawing constituting a part of the disclosure of this invention.

Figure 1:
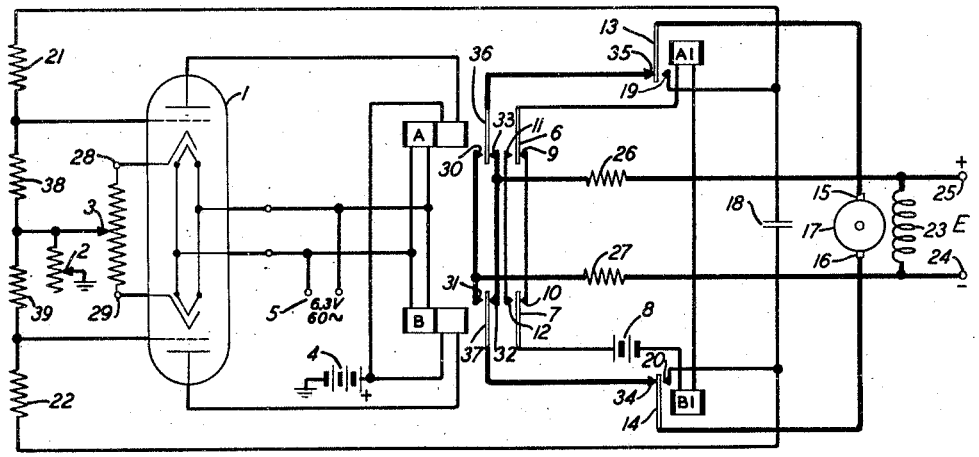
Fig. 1 is a motor control circuit in electrical schematic form illustrating the use of the invention.

The motor control circuit shown in Fig. 1 is in most part taken in slightly rearranged form from the disclosure of a copending application of J. T. L. Brown and C. E. Pollard, Jr., Serial No. 594,048, filed May 16, 1945, now Patent No. 2,472,566. The operation of this circuit is described in detail in the above referenced application and only sufficient description of such operation as is necessary to explain this invention will be set forth herein.

Figure 2A:
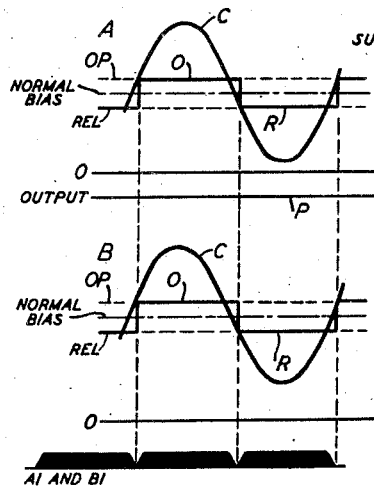
Figs. 2A, 2B and 2C are wave form diagrams referenced in the following detailed description to assist in understanding the functioning of this invention.
Figure 2B:
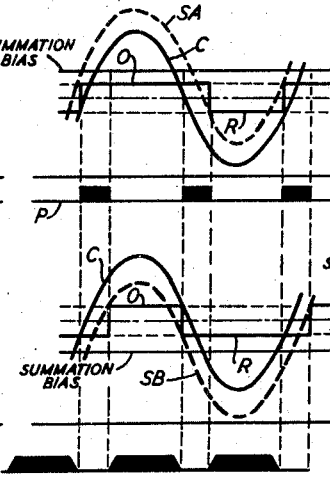
Figure 2C:
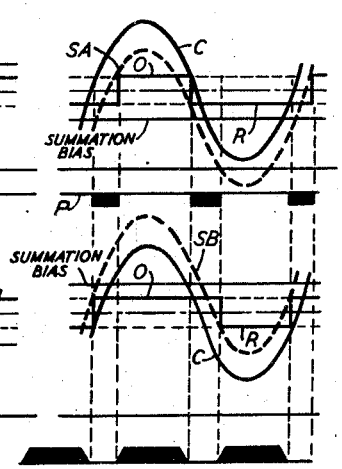

The wave form diagrams appearing in Figs. 2A through 2C are likewise taken in part from the same disclosure referred to above.

The construction of the circuit is obvious from the schematic in Fig. 1. Power leads have been shown heavy and control leads light for clarity of disclosure. In particular, each of the relays A and B has two windings, each of the two windings on each of these relays A and B being electrically independent of the other. Relays AI and BI, on the other hand, each have one winding only, connected as shown. All relays in Fig. 1 are indicated as unoperated; that is, their armatures have not been attracted to the respective cores of the relays.

Numeral 1 designates a double-triode vacuum tube whose grid return and cathode self-bias circuits are conventional. Potentiometer 2, in a well-known manner, regulates the amount of self-bias on both triode sections and thereby controls the amount of plate current which will flow through each section when no external signal is applied thereto.

Potentiometer 3, by unbalancing the respective self-biasing circuits, effectively enables potentials of equal magnitude but of opposite phase to be impressed on the respective grids of the two triode sections of tube 1 whenever potentiometer 3 is adjusted one side or the other of its mid-point, at which point, as indicated in Fig. 1, either grid is at the same potential of the same phase or polarity as the other. This represents a condition, when potentiometer 2 is properly adjusted as previously mentioned, under which condition both sections of the tube 1 are conducting equal values of current through their respective plate circuits. The plate circuit of each triode section is connected to the plate supply 4 through one or primary winding of a different one of the relays A or B as shown.

The source of control signal for this motor control circuit, represented by potentiometer 3 may, of course, be replaced by any suitable source which will produce the same relationship between the grids of tube 1 as to magnitude and phase of input signal as will the control means shown on the Fig. 1. In this exemplary embodiment of the invention the controlling means is disclosed as a mechanical or manual operation of potentiometer 3.

The other or secondary windings of the relays A and B are connected in parallel to a source 5 of 60-cycle 6.3-volt power which may also be used as the filament supply for tube 1, as shown. The magnitude and frequency of this latter source of power may vary within capability limits of the particular relays A and B and the vacuum tube 1. The 60-cycle 6.3-volt source of power is chosen in this disclosure as being of well-known parameters, thereby to facilitate construction of the circuit and explanation thereof as to operation. It is understood that the filaments of tube 1 and the relays A and B could be supplied with power from different sources of various frequencies or voltages.

The operating winding circuits for relays AI and BI are completed in series with battery whenever relays A and B are in the same operative status. As shown in Fig. 1 the armature 6 of relay A and the armature 7 of relay B are both released indicating that these relays A and B are both unoperated. The windings of relays AI and BI are in series with each other, battery 8, armatures 6 and 7, respectively, of relays A and B and contacts 9 and 10, respectively, of relays A and B. When relays A and B are both unoperated, relays AI and BI will operate over the above circuit. A similar operating circuit exists for relays AI and BI when relays A and B are both operated, this time over contacts 11 and 12, respectively, instead of 9 and 10 of relays A and B. It is to be understood that either one of the respective wires from 9 to 10 or from 11 to 12 may be omitted without materially affecting the operation of the invention.

When relays AI and BI are operated by one of the conditions set forth in the preceding paragraph, respective armatures 13 and 14 thereof are attracted, whereby the armature brushes 15 and 16 of the shunt excited direct current motor 17 are connected to opposite terminals respectively of condenser 18 by way of contacts 19 and 20 of respectively relays AI and BI. At the same instant, as will be explained later, the armature brushes 15 and 16 are disconnected from the source of direct current power E.

Condenser 18 is permanently connected between the grid circuits of the two sections of tube 1 by means of isolating resistances 21 and 22 as shown.

As has been described above, whenever relays A and B are in the same operative status the armature brushes 15 and 16 of motor 17 will be connected to opposite terminals of condenser 18. Whenever relays A and B are in different operative status the brushes 15 and 16 of motor 17 will be connected across the power source E in parallel with the shunt excitation field 23 of motor 17. As will be explained later when relay A is operated and relay B released brush 15 of motor 17 will be connected to the negative terminal 24 of the power source E and brush 16 of motor 17 will be connected to the positive terminal 25 of said power source. If the status of relays A and B is reversed from the latter condition these brushes 15 and 16 accordingly will be connected to the opposite terminals of the power source E. Conventional protective resistances 26 and 27 are inserted in the power leads to the motor 17 as shown.

The horizontal group of curves in Figs. 2A, 2B and 2C, designated as A in Fig. 2A, refers to the operation of relay A, the group designated B in Fig. 2A, referring to the operation of relay B. With the signal voltage equal in magnitude and phase on both grids of tube 1 the respective plate circuits will conduct equal currents. Each of the windings of relays A and B, which are part of these plate circuits as previously described, will conduct equal currents. Whenever the potentiometer 3 is adjusted to make the grid of the upper triode of tube 1 more positive, it also makes the grid of the lower triode section equally less positive. This condition permits the relay A to receive more current through its winding, which is in the plate circuit of the upper triode, and also allows the relay B to receive less current. The line designated "Normal bias" on Figs. 2A through 2C represents the magnitude of current in the right or primary windings of relays A and B due to signals of equal magnitude and phase on the respective triode grids. "Summation bias" represents the magnitude of the same current when the respective triodes are unbalanced as previously explained. The curves C designate the character of the 60-cycle current in the appropriate windings of relays A and B as superimposed upon the "Normal bias" as a reference. The curves SA represent the sum of curves C and "Summation bias" for relay A and represent the total effective operating current through the windings of relay A. The curves SB represent the same effect for relay B. OP represents the magnitude of total effective current through relays A and B necessary for these relays to operate. REL represents the magnitude of total effective current through relays A and B below which these relays will release.

Fig. 2A represents the condition of relays A and B when potentiometer 3 is at substantially its mid-point where the control signals to the grids of the two triodes are equal in magnitude and phase and these triodes are consequently conducting equal currents.

Fig. 2B represents the condition of relays A and B when the potentiometer 3 is near the end 28 thereof, whereby the upper triode is conducting more and the lower triode less than in Fig. 2A.

Fig. 2C is the condition wherein the upper triode is conducting less and the lower triode more than in Fig. 2A by virtue of potentiometer 3 being near its end 29.

As shown on the curves of Fig. 2A relays A and B will operate and release simultaneously as indicated by lines O and R. As previously explained this represents the condition wherein the motor 17 receives no power from source E. The circuit from the negative terminal 24 of source E, when relays A and B are both released, is traced to the front or open contact 30 of relay A and the unoperated front or open contact 31 of relay B through armature protective resistance 27 for motor 17. The circuit from the positive terminal 25 of source E is traced through the armature protective resistance 26 over the back or closed contact 32 of relay B and the back or closed contact 33 or relay A to the back contacts 34 and 35 of respective relays B1 and A1. These latter contacts 34 and 35 are open since, as previously explained, relays A1 and B1 are operated when relays A and B are in the same operative status. It is clear that motor 17 receives no power under these circumstances. Similarly, the terminals 24 and 25 of source E are not connected to motor 17 when relays A and B are both operated. The curve P in Fig. 2A indicates that no power is supplied to motor 17 under these conditions. The curve designated "A1 and B1" indicates approximate periods of time condenser 18 is connected to motor 17, these periods of time occurring during the operation of relays A and B when these relays are both operated or both released as previously described.

In Fig. 2B since relay A operates prior to relay B and releases later there are two portions of each cycle of the alternating current curve C during which relay A is operated and relay B released. These periods of time are represented in curve P for Fig. 2B to indicate that during these finite periods of time the brushes 15 and 16 of motor 17 will be connected respectively to terminals 24 and 25 of source E to thereby allow motor 17 to receive power. At all other periods during the said cycle relays A and B will either both be operated or released. It is seen that if relay A is operated and relay B released the negative terminal 24 of power source E is connected by way of resistance 27 to the front contact 30 of relay A, operated armature 36 of relay A, back contact 35 of relay A1 and unoperated armature 13 of relay A1 to brush 15 of motor 17. By a similar path the positive terminal 25 of source E is connected by way of the back contact 32 of relay B, unoperated armature 37 of relay B, back contact 34 of relay B1 and unoperated armature 14 of relay B1 to brush 16 of motor 17. The motor 17 will thus be connected to said power source E during these short periods of time representing a different operative status for each of relays A and B, it being remembered that relays A1 and B1 are not operated during such periods. The curve P of Fig. 2B represents pulses of power supplied to motor 17 in the above manner. Curve "A1 and B1" again indicates the approximate periods of time when condenser 18 is connected to the armature of motor 17.

As shown in Fig. 2C when the lower triode of tube 1 conducts more heavily than under balanced condition and the upper triode conducts less heavily, relay B will operate prior to relay A and release later. This condition, as indicated in Fig. 2C will allow pulses of power, per curve P of Fig. 2C, to energize motor 17 but in the reverse polarity direction from the condition in Fig. 2B. When relay B is operated and A released, the negative terminal 24 of power source E is connected by way of protective resistance 27 to the front contact 31 of relay B, operated armature 37 of relay B, back contact 34 of relay B1 and unoperated armature 14 of relay B1 to brush 16 of motor 17. The positive terminal 25 of source E is connected by way of back contact 33 of relay A, unoperated armature 36 of relay A, back contact 35 of relay A1 and unoperated armature 13 of relay A1 to brush 15 of motor 17. The polarity of this connection of power is the reverse of that resulting from the condition of Fig. 2B as shown by the respective curves P.

The polarity of the power applied to motor 17 is seen to depend on whether relay A is operated and relay B simultaneously unoperated or the reverse of this status. This status is determined, as has been shown, by the polarity of the control signal represented by potentiometer 3. It is also understood that the speed of said motor 17 depends on the duration of the pulses of power applied to its armature, assuming for simplicity that the pulses are periodic. The duration of the pulses is determined by the difference in operate and release times of relays A and B which depends on the magnitude of the control voltage.

For any assumed condition of the control signal, motor 17 will rotate in a given direction at a predetermined speed, for instance, as determined by the conditions of Fig. 2B. During the period of time when no pulses of power P are applied to motor 17, condenser 18 is connected to the brushes 15 and 16 of said motor as has been described. Since the armature of motor 17, at these instants, is not connected to power source E its speed will generate a counter-electromotive force between brushes 15 and 16 which is proportional to that speed. This electromotive force will charge condenser 18, the charging path of condenser 18 and the armature of motor 17 representing a time constant sufficiently low such that the energy represented by the time duration of the charging current has negligible effect on the motor speed. Each time condenser 18 is so connected to motor 17 the condenser 18 will assume a new voltage substantially equal to or proportional to the counter-electromotive force generated at that instant.

Isolating resistances 21 and 22 connect condenser 18 at all times to respective grids of the triode sections of tube 1 in parallel with the control signal represented by potentiometer 3. The magnitude of the isolating resistances 21 and 22 is such that the time constant represented, when referred to the discharge of condenser 18 through these resistances and the grid returns 38 and 39 is long enough to insure that condenser 18 will retain substantially its total voltage during the periods of time when it is not connected to the armature of motor 17.

The polarity of this condenser voltage which is applied to the tube 1 is seen by examination of Fig. 1 to be opposed to the polarity of the control signal when both are present simultaneously. The effect of said feedback is to oppose the direction of rotation of motor 17 which direction of rotation was instrumental in applying a given polarity of voltage to condenser 18.

The operation of the system is in essence to adjust the potentiometers 2 and 3 to values which will cause motor 17 to rotate in a desired direction at a desired speed. The effect of the condenser is to sample any excess or deficiency of the desired speed and to cause the resulting increase or decrease of counter-electromotive force to respectively retard or assist the speed of said motor, whereby condenser 18, as employed, is part of an effective speed control means.

If at any time, when motor 17 is being supplied with power and condenser 18 has been functioning as previously explained, it is desired to stop said motor, the potentiometer 3 may be returned to its mid-point. Relays A and B at this instant will both release allowing relays A1 and B1 to connect condenser 18 to the armature of motor 17. The voltage present on condenser 18 at this instant represents the speed of said motor and will, since no control voltage is present, cause relays A and B to assume each a different status. This latter condition will be the reverse of that condition present just prior to return of potentiometer 3 to its mid-point. This will cause power to be applied to motor 17 in reverse of that which its direction of rotation represents and such a reverse application of power will have a tendency to stop motor 17 quickly. As before during the succeeding instants, there also will be periods of time when relays A1 and B1 will be operated. This condition is dictated by the fact that condenser 18 will hold its voltage for a finite time due to its long time constant discharge path. If motor 17 has not come to a stop within one-half cycle of the 60-cycle current supplied to relays A and B the condenser will again sample the speed of the motor and correct the feedback voltage accordingly so as to always feed back a signal which has a retarding effect on the speed of the motor and which effect is proportional to the speed. This effect will be felt by the motor as a large retarding force at high speed and a gradually decreasing retarding force as the speed decreases, whereupon the tendency of the motor to reverse direction by virtue of the feedback voltage is practically non-existent in that just prior to zero speed the feedback voltage will be likewise substantially zero.

I do not intend that my invention shall be limited to the disclosure set forth herein since persons skilled in the art may realize many variations of this disclosure within the spirit of my invention. The scope of my invention is limited only by the appended claims.

What is claimed is:

1. A motor control system comprising a first source of control signal of variable parameters, a second source of control signal of fixed parameters, two switching devices, control circuits to said devices, circuit means for permitting said second signal acting alone upon said control circuits to open and close circuit through said devices in step with each other, circuit means for superimposing said first signal upon said second signal in said control circuits to cause the opening and closing of circuits through said devices out of step with each other by an amount corresponding to parameters of said first signal, a source of power, a motor connectable with said power source by said devices only when said devices are in different operative status, a condenser, other switching means operated by said devices only when said devices are in the same operative status to disconnect said motor from said power source and to connect said motor to said condenser, and circuit means rendering the charge acquired by said condenser effective to counteract the effect of said first signal.

2. A motor control system comprising a first source of control signal of variable parameters, a second source of control signal of fixed parameters, two switching devices, energizing paths for said devices, circuit means for permitting said second signal acting alone upon said energizing paths to open and close said devices in step with each other, circuit means for superimposing said first signal upon said second signal in said energizing paths to cause the opening and closing of said devices out of step with each other by an amount corresponding to parameters of said first signal, a source of power, a motor connectable with said power source by said devices only when said devices are in different operative status, a condenser, other switching means operated by said devices only when said devices are in the same operative status to disconnect said motor from said power source and to connect said motor to said condenser, and circuit means rendering the charge acquired by said condenser effective to counteract the effect of said first signal.

3. A motor control system comprising a first source of control signal of variable parameters, a second source of control signal of fixed parameters, two relays, energizing paths for said relays, circuit means for permitting said second signal acting alone upon said energizing paths to operate and release said relays in step with each other, circuit means for superimposing said first signal upon said second signal in said relay energizing paths to cause the operation and release of said relays out of step with each other by an amount corresponding to parameters of said first signal, a source of power, a motor connectable to said power source by said relays only when said relays are in different operative status, a condenser, relay means operative by said relays only when said relays are in the same operative status to disconnect said motor from said power source and to connect said motor to said condenser, and circuit means rendering the charge acquired by said condenser effective to counteract the effect of the first signal.

4. A motor control system comprising a control circuit including two relays and energizing paths for said relays and additional relay means, means for operating and releasing said relays in step with each other, a source of power, a motor connectable with said power source under the control of said relays and of said relay means, said relays arranged to connect said motor to said power source only when said relays are in different operative status, said relay means arranged to be operated by said relays only when said relays are in the same operative status, a condenser, said relay means arranged when operated to disconnect said motor from said power source and to connect said motor to said condenser to charge said condenser according to the speed of said motor, a source of control signal, circuit means for impressing said signal upon the energizing paths for said relays in said control circuit to cause the operation and release of said relays out of step with each other, and means for rendering the charge on said condenser effective to conteract the effect of said signal.

5. A motor control system comprising two conducting paths, a source of variable control signal, circuit means for impressing said signal upon said paths to alter the relative conductivity thereof, a relay in each path, control means for operating and releasing said relays in step with each other in the absence of said signal and out of step with each other in the presence of said signal, a power source, a motor connectable with said power source by said relays only when said relays are in different operative status, a condenser, additional relay means operated by said relays only when said relays are in the same operative status to transfer said motor from said power source to said condenser to charge said condenser according to the speed of said motor, and means for rendering the charge on said condenser effective to counteract the effect of said signal.

6. A motor control system comprising two electronic paths, a source of variable control signal, circuit means for impressing said signal upon said paths to alter the relative conductivity thereof in accordance with at least one parameter of said signal, a relay in circuit with each path, control means for operating and releasing both relays in step with each other in the absence of said signal and out of step with each other in the presence of said signal, a source of power, a motor connectable to said power source by said relays only when said relays are in different operative status, a condenser, additional relay means operated by said relays only when said relays are in the same operative status to transfer said motor from connection to said power source to connection to said condenser to charge said condenser an amount corresponding to the speed of said motor, and means for rendering the charge on said condenser effective to counteract the effect of said signal.

7. A motor control system comprising two electronic paths, a source of control signal of variable polarity and magnitude, circuit means for impressing said signal on said paths to alter the relative conductivity thereof in accordance with the magnitude and polarity of said signal, a relay in circuit with each path, control means for operating and releasing both relays, said relays operating and releasing in step with each other when said signal is not present and out of step with each other when said signal is present, a source of power, a reversible motor connectable to said power source by said relays only when said relays are in different operative status for operating said motor in a direction in accordance with the relative conductivity of said paths and at a speed in accordance with the extent of which said relays are out of step, a condenser, additional relay means operable by said relays only when said relays are in the same operative status, said additional relay means arranged when operated to transfer said motor from connection to said power source to connection to said condenser to charge said condenser an amount corresponding to the speed of said motor, and means for rendering the charge on said condenser effective to counteract the effect of said signal.

8. A motor control system comprising a normally conducting first electronic path, a normally conducting second electronic path, a control signal, means for impressing said control signal upon said paths whereby one of said paths becomes more conducting and the other path less conducting when said signal is of one polarity and said other path becomes more conducting and the said one path less conducting when said signal is of the opposite polarity, an electromagnetic relay in circuit with each of said paths, means for enabling said relays to alternate continuously between equal durations of operated and unoperated status under normally conducting conditions of said paths, said relays enabled to alternate between unequal durations of operated and unoperated status when said signal is impressed upon said paths, a source of power, a reversible motor connectable to said source by said relays only when said relays are in different operative status for operation of said motor in a direction in accordance with the relative conductivity of said paths, a condenser, additional electromagnetic relay means operable when said first-mentioned relays are both in the same operative status for transferring said motor from connection to said source to connection to said condenser and means for rendering the charge on said condenser effective to counteract the effect of said signal.

9. A motor control system comprising a normally conducting first electronic path, a normally conducting second electronic path, a control signal of variable polarity and magnitude, means for impressing said control signal upon said paths whereby one of said paths becomes more conducting and the other path less conducting when said signal is of one polarity and said other path becomes more conducting and the said one path less conducting when said signal is of the opposite polarity, the relative degree of conductivity of said paths depending upon the magnitude of said signal, an electromagnetic relay in circuit with each of said paths, means for enabling said relays to alternate continuously between equal durations of operated and unoperated status under normally conducting conditions of said paths, said relays enabled to alternate between unequal durations of operated and unoperated status when said signal is impressed upon said paths, a source of power, a reversible motor connectable to said source by said relays only when said relays are in different operative status for operation of said motor in a direction and at a speed in accordance with the relative conductivity of said paths, a condenser, additional electromagnetic relays operable when said first-mentioned relays are both in the same operative status for transferring said motor from connection to said source to connection to said condenser, whereby said condenser acquires a charge proportional to the counter-electromotive force generated by said motor, and means for rendering the charge on said condenser continuously effective to counteract the effect of said signals.

10. A motor control system comprising a normally conducting first electronic path, a normally conducting second electronic path, a control signal of variable polarity and magnitude, means for impressing said control signal upon said paths whereby one of said paths becomes more conducting and the other path less conducting when said signal is of one polarity and said other path becomes more conducting and the said one path less conducting when said signal is of the opposite polarity, the relative degree of conductivity of said paths depending upon the magnitude of said signal, an electromagnetic relay in circuit with each of said paths, means for enabling said relay to alternate continuously between equal durations of operated and unoperated status under normally conducting conditions of said paths, said relays enabled to alternate between unequal durations of operated and unoperated status when said signal is impressed upon said paths, a source of direct current power, a reversible direct current motor connectable to said source by said relays only when said relays are in different operative status for operation of said motor in a direction and at a speed in accordance with the relative conductivity of said paths, a condenser, additional electromagnetic relay means operable when said first-mentioned relays are both in the same operative status for transferring said motor from connection to said source to connection to said condenser, whereby said condenser acquires a charge substantially equal to the counter-electromotive force generated by said motor, and circuit means permanently connecting said condenser in the control circuit of said electronic paths thereby to counteract the effect on said paths of said signal.

11. A motor control system comprising a normally conducting first electronic path, a normally conducting second electronic path, a control signal of variable polarity and magnitude, means for impressing said control signal upon said paths whereby one of said paths becomes more conducting and the other path less conducting when said signal is of one polarity and said other path becomes more conducting and the said one path less conducting when said signal is of the opposite polarity, the relative degree of conductivity of said paths depending upon the magnitude of said signal, an electromagnetic relay in circuit with each of said paths, means for enabling said relay to alternate continuously between equal durations of operated and unoperated status under normally conducting conditions of said paths, said relays enabled to alternate between unequal durations of operated and unoperated status when said signal is impressed upon said paths, a source of direct-current power, a reversible direct-current motor connectable to said source by said relays only when said relays are in different operative status for operation of said motor in a direction and at a speed in accordance with the relative conductivity of said paths, a condenser, additional electromagnetic relay means operable when said first-mentioned relays are both in the same operative status for transferring said motor from connection to said source to connection to said condenser, whereby said condenser acquires a charge substantially equal to the counter-electromotive force generated by said motor, and circuit means permanently connecting said condenser in the control circuit of said electronic paths such that the polarity of the charge on said condenser is opposite to the polarity of the signal which produced that charge.

EDMUND R. MORTON.

REFERENCES CITED

The following references are of record in the file of this patent:

UNITED STATES PATENTS

| Number | Name | Date |
|---|---|---|
| 2,175,009 | Anderson | Oct. 3, 1939 |
| 2,264,333 | Satterlee | Dec. 2, 1941 |
| 2,325,092 | Andrews | July 27, 1943 |